June 14, 1960 — C. A. CRECELIUS — 2,940,173
TRAWL CABLE METER
Filed Jan. 20, 1958 — 3 Sheets-Sheet 1

INVENTOR.
CARLYLE A. CRECELIUS
BY
Robinson + Berry
ATTORNEYS

June 14, 1960  C. A. CRECELIUS  2,940,173
TRAWL CABLE METER
Filed Jan. 20, 1958  3 Sheets-Sheet 2
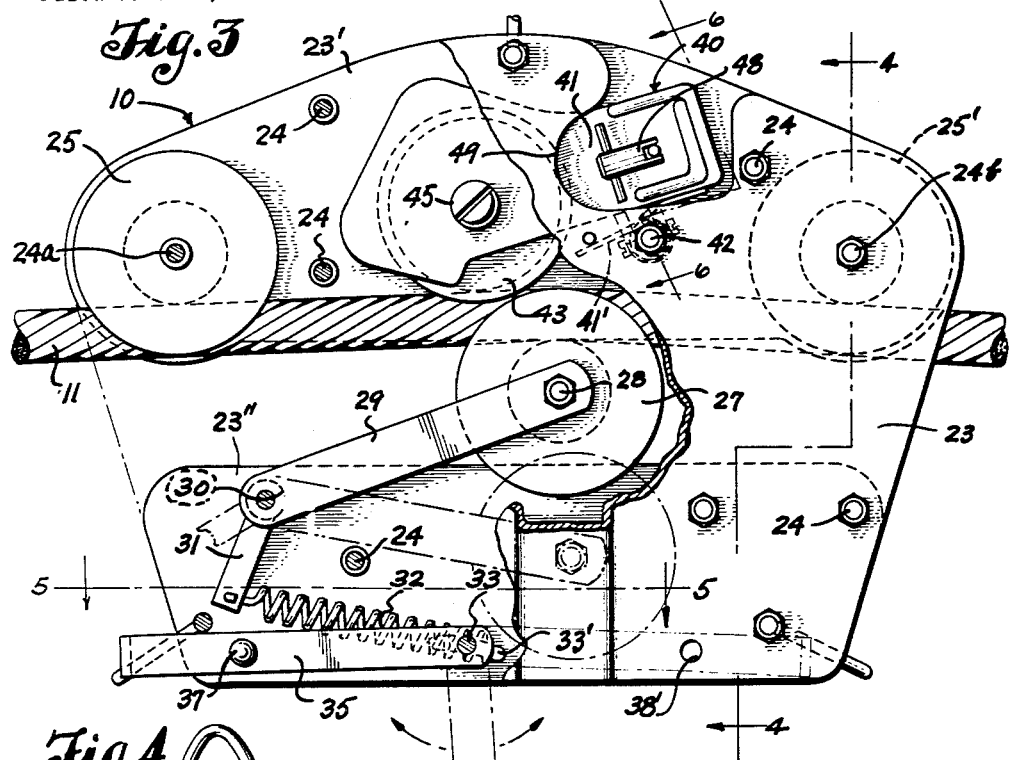
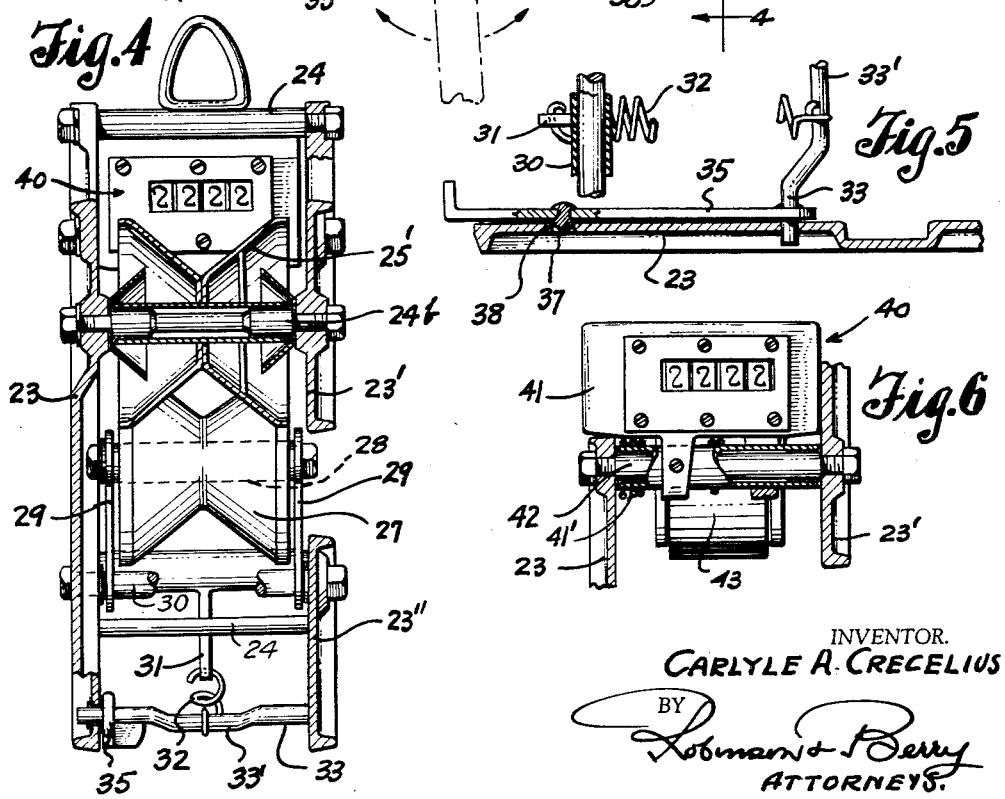
INVENTOR.
CARLYLE A. CRECELIUS
BY
Robinson & Berry
ATTORNEYS.

June 14, 1960  C. A. CRECELIUS  2,940,173
TRAWL CABLE METER
Filed Jan. 20, 1958  3 Sheets-Sheet 3
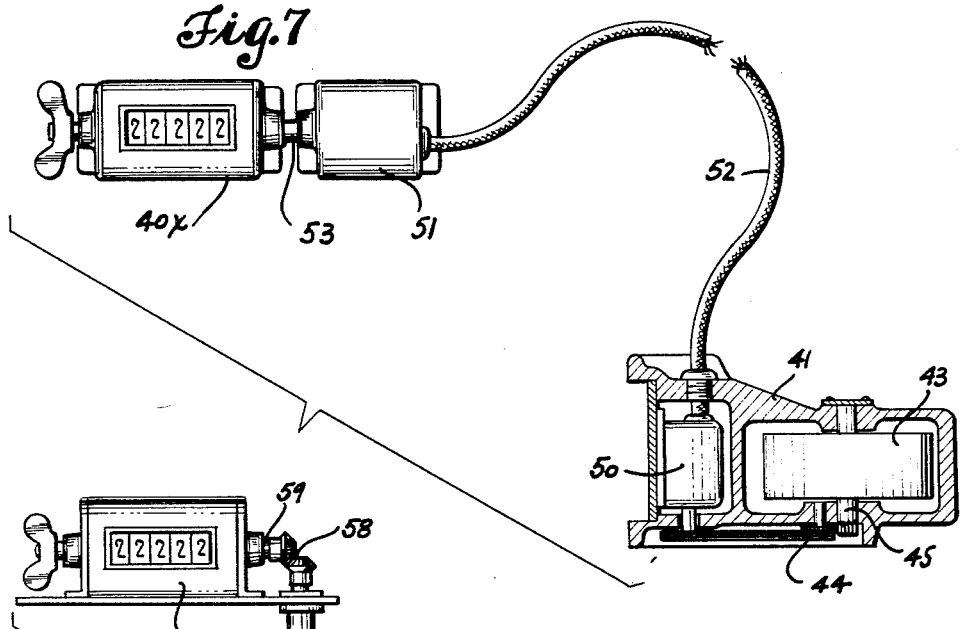
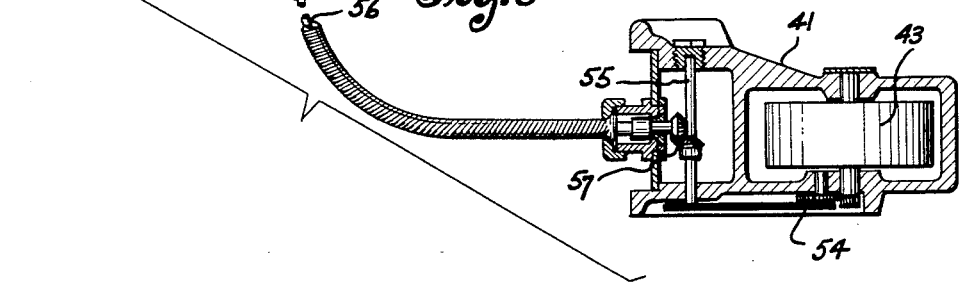
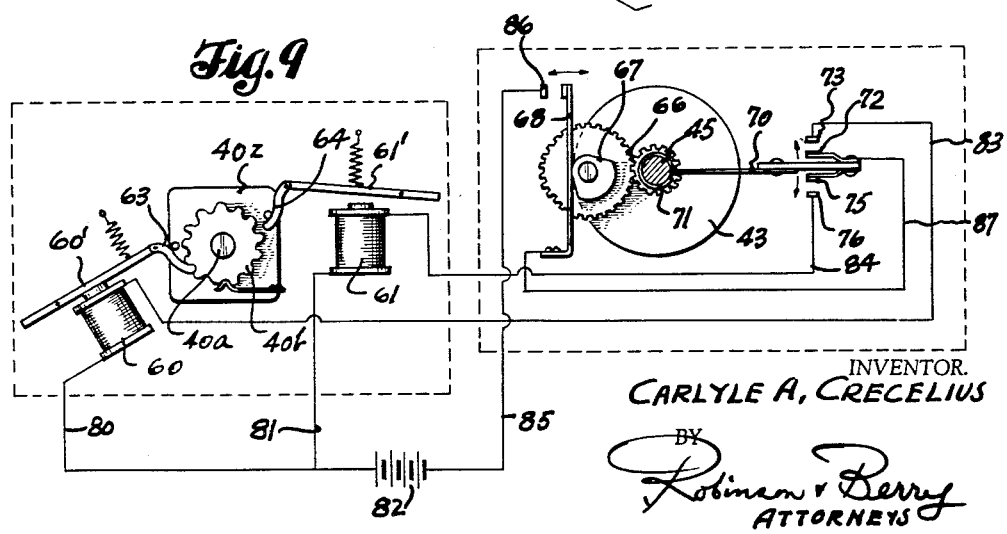
INVENTOR.
CARLYLE A. CRECELIUS
BY
Robinson & Berry
ATTORNEYS though only after it has been given a degree of rotation, with respect to the cable, that gives to it proper balance for its efficient, accurate operation, as has been determined through experience with the device.

United States Patent Office 2,940,173
Patented June 14, 1960

2,940,173

TRAWL CABLE METER

Carlyle A. Crecelius, Vashon, Wash.

Filed Jan. 20, 1958, Ser. No. 709,878

5 Claims. (Cl. 33—134)

This invention relates to trawl cable meters. More particularly, it has reference to improvements in devices for that purpose which are especially desirable for use in connection with certain fishing operations but are not necessarily confined thereto.

Explanatory to one of the typical uses of the present invention, it will here be noted that commercial fishermen use techniques known as "dragging," "trawling" and "midwater trawling" which generally have reference to a method of pulling a net through the water, at different distances below the surface or closely along the ocean bottom. This type of operation is controlled by two trawl cables, or warps, which are normally wound on independently powered and independently controlled winches located on the deck of the fishing boat. In this type of fishing, it is quite important that the two trawl cables be paid out equal or identical distances in order to assure the proper set of the trawl.

Heretofore, it has been a general practice for the fishermen to mark the cables by the insertion of wire, manila or other strands therethrough at 25 fathom intervals. The winch operators then count these markers as they set the nets to determine that both cables are run out to equal extent. In actual practice, one cable may be stretched to greater extent than the other, or a cable may be parted and require splicing thus rendering the markings inaccurate, and requiring that the cables be dragged from the winches along a dock, or into wherever space is available, for their remarking.

The object of the present invention is to provide a trawl cable meter whereby the length of cable run off from a drum, or payed out from storage can be accurately determined and without reference to markers applied to the cable.

It is a further object of the invention to provide a cable meter of the present character through which cable splices or other cable irregularities may pass without detrimentally affecting the measuring operation, and which maintains its accuracy regardless of violent motion of the boat or support on which it is located.

A further object of the invention is to provide a metering device that, aside from its use in connection with fishing operations, can be employed with equal success for measuring cables in warehouses or tramways, and can be advantageously employed in mine sweeping operations and for measuring submarine cable as laid. It is a further object to provide a metering device that has certain desirable applications in oil well drilling and analogous operations.

The invention further provides means for permitting the metering device to "float" with the cable to which it is applied, as the latter changes position in being unwound from a cable drum or with those changes of positions that are incident to travel of the boat from which the cable is being payed out, in rough water.

Other objects reside in the provision of a frame design which permits mounting the metering device on and removing it from a cable to be measured without having to thread the cable through the meter, and in the provision of means whereby the device automatically accommodates itself to cables of all sizes within its capacity limits.

It is also an object to provide for protecting those parts of the device which might be damaged by salt water, corrosion, cable lubricants or dirt by use of suitable seals, gaskets or shield.

Further objects of the invention reside in the provision of means for the operation of a meter head that is located remotely from the meter as applied to a cable for its measurement.

Still further objects and advantages of the invention reside in the details of construction of its various parts; in their combination and in the mode of use of the device as will hereinafter be fully described.

In accomplishing the above mentioned and other objects of the invention, I have provided the improved details of construction, the preferred forms of which are illustrated in the accompanying drawings, wherein:

Fig. 3 is an enlarged view of the present cable meter as seen from the closed side, with a part of the adjacent side plate of the frame structure broken away to better disclose the housed elements.

Fig. 4 is a vertical cross-section taken on line 4—4 in Fig. 3.

Fig. 5 is a sectional detail taken on line 5—5 in Fig. 3.

Fig. 6 is a section taken on line 6—6 in Fig. 3.

Fig. 7 is a view illustrating the operation by synchronized motors of a meter head at a location remote from the metering mechanism as applied to a cable.

Fig. 8 is a similar view showing operation by mechanical means of the meter head when located remote from the cable mechanism.

Fig. 9 is a schematic system for magnetic operation of a remotely located meter head.

Figure 1:
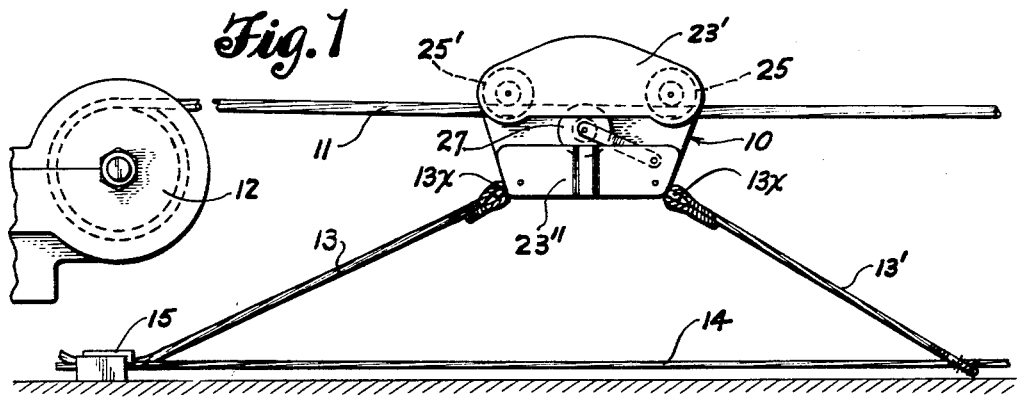
Fig. 1 is a side view of a cable meter embodied by the present invention, showing its open side and as applied to a cable for its measurement, and showing one form of means for anchoring it in its normal position of use.
Figure 2:
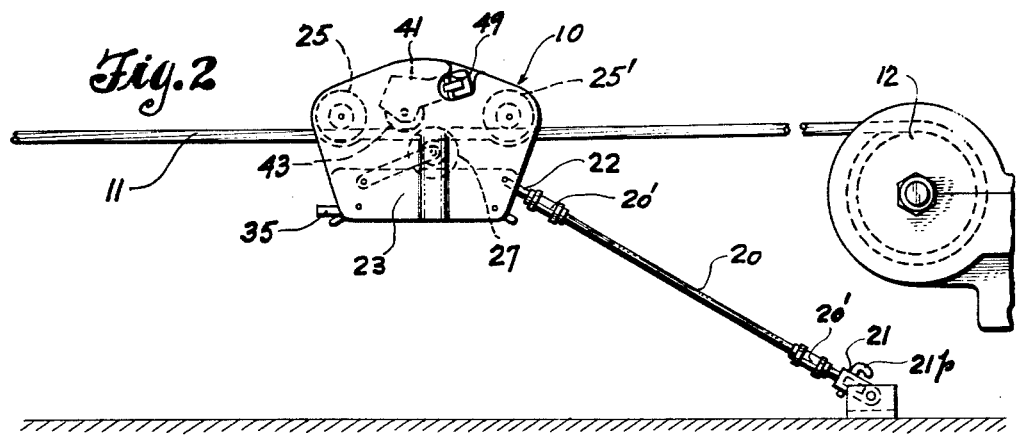
Fig. 2 is a similar illustration but showing the closed side of the meter housing and illustrating an alternative form of means for anchoring the meter in position of use.
Figure 2A:
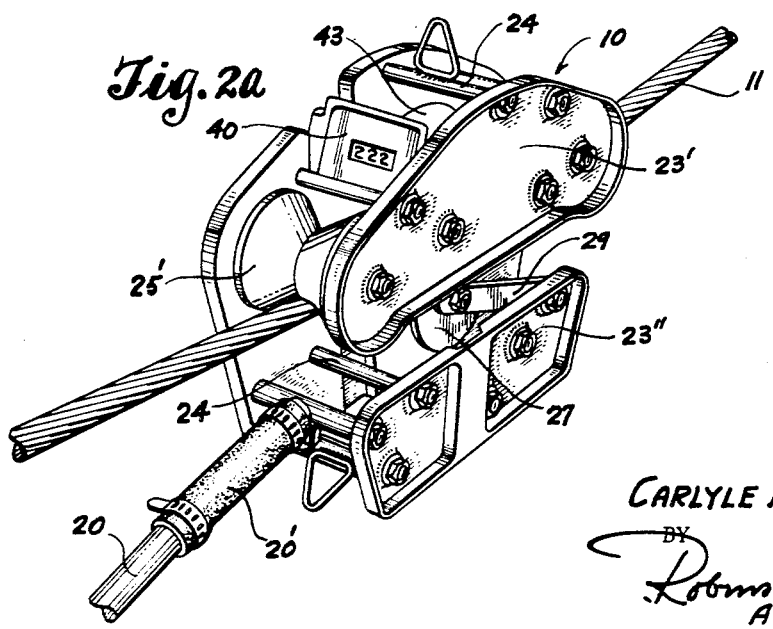
Fig. 2a is a perspective view of the present device as applied to a cable for use.

Referring more in detail to the drawings:

The metering device of this invention is designated in its entirety by reference numeral 10, and in Figs. 1, 2, 2a and 3, it is shown as applied for use on a cable 11. In Figs. 1 and 2, the cable is shown as being payed out from a drum 12 mounted as for example, on the deck of a fishing boat.

In view of the fact that the lateral direction of travel of the cable as payed out from the drum is constantly changing, and this lateral and also the up and down movement of the cable may be quite erratic if it is being payed out from a drum carried on a boat operating in rough water, it is necessary, or at least it is advisable, to anchor the meter by securing means that permits it to readily accommodate itself to this movement. As seen in Fig. 1, the securing means employed comprises paired "preventer" cables or ties 13—13' which have ends suitably attached to the opposite end portion of the frame structure of the meter, as at 13x, and their other ends suitably anchored to the boat deck or, as here shown, to a taut cable 14 that extends in the same general direction of cable 11 and which is anchored at its ends, by suitable means, or by means as shown at 15, to the deck of the boat. These preventers permit the metering device to swing laterally, or move up and down with the cable 11 but not to change position in its lengthwise or axial direction. The length of the ties 13—13' may be made more or less as required to satisfy conditions of use. Where the preventer cable 13 is attached to a ring or fitting on the deck of the boat, a helical metal spring or rubber snubber may be used in lieu of preventer cable 13' to afford the necessary accommodation to the movement of the meter on the cable.

Another form of anchoring means has been shown in Fig. 2 wherein it is seen that the metering device 10 is held against travel away from or toward the drum by means of a rigid rod 20 of appropriate length.

This preventer rod 20 is attached to the meter frame at one end and to the deck or other fixed part of the boat at its other end through the mediacy of swivel joints as designated at 21 and 22. In addition to these swivel joints, each end is provided with a universal joint 20' permitting bending flexibility to accommodate lateral movement of the cable as it moves from end to end of the winch drum, while at the same time restraining the meter from oscillating or rolling about the axis of the cable. A simple form of universal joint consists of a short length of fabric reinforced rubber hose firmly clamped on rod 20 and on the mating fittings 22 and 21.

Still another feature at the deck attached end provides a quick releasing pin 21p applied to fitting 21 by which the meter and attached rod 20 may be released from the deck when it is desired to remove the meter for servicing, stowing or for other reasons. The pin 21p would be the toggle lock type commonly used on boats where it is necessary to join two parts positively, yet have them easily disconnectable without the use of tools. Either of these preventer connectors will permit the meter to have freedom of movement with the changing position of the cable without detriment to its counting action.

In the present instance, neither the preventer cables 13—13' nor the rod 20 have any supporting effect on the metering device 10. Furthermore, the metering device does not guide the cable to it but it merely rides freely on and moves with the cable as it sways laterally or moved up or down as payed out from the cable winding drum.

The frame structure comprises a face plate 23 at one side, and vertically spaced upper and lower plates 23' and 23" at the opposite side; the opposite side plates being joined rigidly in parallel, spaced relationship, by a plurality of tie bolts 24. Mounted between the opposite face plates to revolve freely on certain of these tie bolts which have been designated in Fig. 3 by numerals 24a and 24b, are sheave wheels 25 and 25'; these sheaves being of the same diameter and mounted at the same horizontal level in the frame and are located at its forward and rearward ends, respectively.

Located between the opposite face plates of the frame structure below the cable 11, as seen in Fig. 3, and substantially midway of the sheave wheels 25—25', is an idler sheave 27 which is urged upwardly against and held in rolling contact with the cable 11. This sheave is revolvable on a supporting axle 28 carried by a yoke comprising a pair of lever arms 29—29 that are fixed to and extend forwardly and upwardly from a cross-shaft 30 that extends between and is rotatably supported at its ends from the face plates 23—23", as shown in Fig. 4. A lever arm 31 extends downwardly from the cross-shaft of the yoke and a coil spring 32 is attached under tension to the lower end of the lever arm and to the throw portion 33' of a crank shaft 33 that is pivotally mounted at its opposite ends in the opposite face plates as shown in Figs. 4 and 5. This spring when held under tension, operates to press the sheave wheel 27 upwardly against the cable 11 to retain it seated against the wheels 25—25'.

The meter is mounted on cable 11 by passing the gap between side plates 23' and 23" over the cable and bringing the undersides of sheave wheels 25 and 25' into frame supporting contact with the cable as shown in Fig. 3. To facilitate this, the holding tension of spring 32 is released and sheave 27 is moved down to its dotted line position shown in Fig. 3. With the cable seated, the sheave 27 is then brought back to holding position.

It is observed in Fig. 5 that the throw of the crank shaft 33 is normally held in such position as to place the coil spring 32 under substantial tension by means of a tension release lever 35; this lever is fixed at one end to the shaft 33 close to the inside of housing sidewall 23 as shown in Fig. 5. It is releasably held in this horizontal position by a detent 37 that is riveted to arm 35 and which projects into a hole 38 in the adjacent face plate 23.

If it is desired to release the tension on the spring 32 so that the sheave 27 can be swung downwardly from the cable 11, a lateral inward pressure is applied to the free end of arm 35. This displaces detent 37 from the hole 38 in the frame plate and the arm is then swung downwardly and through an arc of 180° where detent 37 is received in a hole 38' inp lae 23 as shown in the dotted line position in Fig. 3. This rotates the crank shaft 33 to its tension releasing position and permits the sheave wheel 27 to drop away from the cable 11.

The counting head or meter head used with the present device is designated in its entirety by numeral 40. Its position is between the sheaves 25—25' and above the cable 11. This counting head comprises a housing 41 that is pivotally supported at its forward end for rocking movement on a cross-shaft 42 that extends horizontally between the face plates of the frame structure and above the cable. At its rearward end the housing 41 mounts a friction wheel 43 that rests upon the cable, and is caused to be rotated in accordance with the longitudinal travel of the cable. The contact surface of the friction wheel is preferably made of a tough synthetic rubber which is unaffected by lubricants commonly used on wire cables yet offers excellent traction and wear resistance. A suitable spring 41', acting between the metering head housing 41 and frame plate 23, provides necessary pressure to assure traction between friction wheel 43 and cable 11. The friction wheel 43 is mounted for rotation by an axle 45 to which it is fixed. This axle operates through a gear and chain belt connection 44 which is like or which corresponds to that shown in Figs. 7 and 8 or other suitable connection to drive the shaft of the counting mechanism in the meter head. The counting mechanism employed is of that kind that counts or indicates the length of cable passing through the metering mechanism in accordance with the turning of friction wheel 43. It is of conventional type and not specifically claimed herein.

Assuming that the metering device is so constructed and has been applied to the cable 11 as shown, it will be understood that as the cable 11 passes through the device, it drives the friction wheel 43 of the meter head and this operates the counting mechanism to visually indicate on its numbered dials, the length of cable passed through. The counter adds or subtracts depending on the direction of cable movement through the meter. The indication may be in feet, yards, fathoms, rods or other units of measure as may be desired. Direct readings may be taken from the disks or dials of the counter. It is preferred that the meter head is of that type that can be re-set at any time and in Fig. 3 the particular means whereby this may be accomplished is designated by reference numeral 48, and it is easily accessible through a recessed part of the face plate 23 designated at 49.

It is desirable in some instance that the counting mechanism be located at a point remote from the device 10 as applied to the cable 11. In fact, there are instances when the device 10 may be remote from the winch operator or observer and not easily read. Provision therefore has been made for operating a counting or recording mechanism when located at some convenient place, away or remote from the place of application of the device 10. For example, in Fig. 7, I have designated the housing 41 as being equipped with friction wheel 43 having a gear and sprocket chain drive for an "Autosyn," "Selsyn" or other suitable synchronous transmitter designated at 50; this transmitter being electrically connected with a complemental receiver 51 through a length of cable 52 that provides the required electrical connections. The receiver 51 is connected with the recorder or counter 40x by suitable drive designated at 53, and it can be located at any convenient remote location as, for example, in the wheel house of a fishing vessel.

In Fig. 8, I have illustrated a mechanical driving connection between the friction wheel 43 supported by housing 41 and the counter or recorder 40x located remote from the metering device. In this showing, the friction wheel 43, as carried in the housing 41 for contact with cable 11, operates through a gear and sprocket chain connection 54 to drive a cross-shaft 55. The counter, which may be located at any remote point, is connected with the cross-shaft through a flexible cable drive 56; this having suitable geared connections at its ends, as at 57 and 58 with shaft 55 and the counter drive shaft 59.

In Fig. 9, I have illustrated use of an electrical apparatus for effecting the driving of a remotely located counter or recorder which is designated by reference numeral 40z and which has its drive shaft 40a equipped with driving ratchet wheel 40b with which actuating solenoids 60 and 61, for driving the wheel in opposite directions are associated; it being shown that the armature 60' of solenoid 60 carries a pawl 63 engageable with the wheel for turning it in one direction and armature 61' of solenoid 61 carries a pawl 64 for driving it in the opposite direction. This mechanism also includes the friction wheel 43 for contact with the cable 11. This wheel operates through a gear reduction as shown at 66 for rotating a cam 67 to periodically actuate a switch lever 68 to momentarily close a circuit to either solenoid 60 or 61 depending on the direction of travel of the cable 11. Each time the circuit is closed by the cam action, the energized solenoid actuates its armature and pawl to advance the recorder 40z a predetermined interval. The selection of the solenoid in accordance with direction of travel of the cable is effected by a switch lever 70 that has a friction tight mounting 71 at its inner end on the mounting shaft 45 of wheel 43. At its outer end this lever carries a circuit contact 72 which will swing into engagement with a contact 73 to close a circuit through solenoid 60 when the shaft turns in one direction, and also carries a contact 75 which swings into engagement with a contact 76 to close a circuit to solenoid 61 when the shaft turns in the opposite direction. Thus the indicator or recorder 40z will show length of cable payed out or wound in.

The circuit connections shown comprises circuit connections 80 and 81 from one side of each of the solenoids to one pole of a battery or source of supply of electrical energy 82, and circuit connections 83 and 84 from the contacts 73 and 76 to the other sides of the solenoids respectively. Also, a circuit line 85 leads from the other pole of the battery 82 to a contact 86 for switch lever 68, and a circuit connection 87 from switch arm 70 to switch arm 68.

Any of these several indicators or recorders, designed for remote control, may be selectively used depending on desires or requirements.

Another feature of the present design provides adequate physical protection for the meter head against damage either by rough or careless handling or by impact with the splices, marks or other irregularities on the cable being measured. This protection and overall strength of the meter design are achieved while at the same time keeping the weight and bulk of the device at a minimum.

What I claim as new is:

1. A cable meter comprising a housing through which a cable can be drawn, housing supporting sheave wheels mounted in tandem in said housing for rolling on said cable as drawn through the housing; means attached to said housing for holding it against axial travel with the cable while supported thereon, yieldable means mounted in said housing and engaging the cable between and in opposed relationship to said sheave wheels, to maintain the supporting relationship of the cable to said sheave wheels, a meter head mounted in said housing and operable for registering the length of cable passing through the housing, a friction roller supported yieldingly in said housing in rolling contact with said cable and means operatively connecting said roller and meter head for the functional operation of the latter.

2. A meter for measuring a horizontally traveling cable; said meter comprising a housing through which said cable may be drawn, housing supporting sheave wheels mounted in tandem in said housing for rolling on said cable as it is drawn through the housing, means attached to said housing for anchoring it against axial travel with the cable while supported thereon, means mounted in said housing and engaging the cable at a point between and in opposition to said sheave wheels to maintain the supporting position of the sheave wheels relative to said cable, a meter head mounted by the housing and operable for registering the length of cable that passes through the housing, said meter head comprising a frame that is pivotally mounted in said housing, a friction wheel mounted in said frame, spring means acting against said pivoted frame to cause said friction wheel to be maintained yieldingly in rolling contact with the cable as it is drawn through the housing and means operatively connecting said friction wheel and meter head for the functional operation of the latter.

3. A meter for measuring a traveling cable; said meter comprising a housing through which said cable may be drawn, housing supporting sheave wheels mounted in tandem in said housing for rolling upon said cable as it moves through the housing, a pair of flexible ties attached to the housing for anchoring it against travel with the cable, a sheave wheel mounted in the housing, having a yieldable support whereby it is urged upwardly and yieldingly against the cable to maintain said housing supporting sheave wheels in contact therewith, a meter head mounted in the housing for registering the length of cable passing through it, a friction wheel mounted in said housing in rolling contact with said cable at a point between the housing supporting sheave wheels, and a driving connection between said friction wheel and said meter head whereby the turning of said friction wheel causes the meter head to record the length of cable passed through the housing.

4. A cable meter of the character described comprising a rigid housing through which a cable can be drawn, housing supporting sheave wheels mounted in tandem in said housing for rolling upon a cable as it is drawn through the housing, a meter head having a friction drive wheel positioned in said housing for rolling contact with a cable while being drawn through the housing to drive the meter head to record the length of cable passing through the housing; a yoke pivotally mounted in said housing at the underside of and for swinging movement toward and from the cable, a sheave wheel mounted at the swinging end of said yoke in rolling contact with the cable to retain said housing supporting sheave wheels in contact with the cable, and spring means acting against the yoke to cause the sheave wheel at its end to bear yieldingly against the cable and means operable from outside the housing to release the tension of said spring means.

5. The cable meter of claim 4 including a crank shaft rotatably mounted in the housing and wherein said spring means acting against said yoke comprises a coiled spring that is operatively connected at one end with the yoke and is connected at its other end with the throw of said crank shaft; said crank shaft having a turning lever fixed thereto whereby it may be turned between a position at which the spring is placed under tension, and another position at which all tension is released and the sheave wheel at the end of the yoke is permitted to drop free of the cable.

References Cited in the file of this patent

UNITED STATES PATENTS

| | | |
|---|---|---|
| 1,639,973 | Van Orstrand | Aug. 23, 1927 |
| 2,136,457 | Nixon | Nov. 15, 1938 |
| 2,163,402 | Mason | June 20, 1939 |
| 2,166,212 | Hayward | July 18, 1939 |
| 2,271,742 | McCullough | Feb. 3, 1942 |
| 2,756,506 | Scivally | July 31, 1956 |

FOREIGN PATENTS

| | | |
|---|---|---|
| 118,982 | Great Britain | Sept. 19, 1918 |
| 635,197 | Great Britain | Apr. 5, 1950 |